United States Patent [19]

Bastow et al.

[11] Patent Number: 4,809,969
[45] Date of Patent: Mar. 7, 1989

[54] AUTOMATIC DOCUMENT FEEDER AND REGISTRATION SYSTEM THEREFOR

[75] Inventors: Francis M. Bastow, Newark Valley; William C. Hoffman, Apalachin, both of N.Y.

[73] Assignee: Savin Corporation, Stamford, Conn.

[21] Appl. No.: 919,896

[22] Filed: Oct. 16, 1986

Related U.S. Application Data

[62] Division of Ser. No. 449,132, Dec. 13, 1982, Pat. No. 4,621,799.

[51] Int. Cl.[4] ............................................. B65H 7/14
[52] U.S. Cl. ..................................................... 271/258
[58] Field of Search ....................... 271/265, 258, 259

[56] References Cited

U.S. PATENT DOCUMENTS 4,121,820 10/1978 Forster ................................. 271/259
4,455,018 6/1984 Colglazier ............................ 271/227

Primary Examiner—Richard A. Schacher
Attorney, Agent, or Firm—Kenyon & Kenyon

[57] ABSTRACT

A sheet feeder transports sheets from a sheet supply, such as a document tray, to a distant location, such as a registration position on the platen of an electrophotographic copier. A sensing device monitors a time period which starts when a sheet advancing mechanism is actuated and ends when a sheet reaches the distant location. An indication of abnormal operation is provided if the sheet does not reach the distant location within a preset time period. The preset time period is initially set at one period of time and subsequently set at a shorter period of time. The initial time period is longer to allow the sheets to become fully engaged with the sheet feeder after initial loading, while the subsequent period is shorter to provide a quicker indication of abnormal operation.

5 Claims, 10 Drawing Sheets

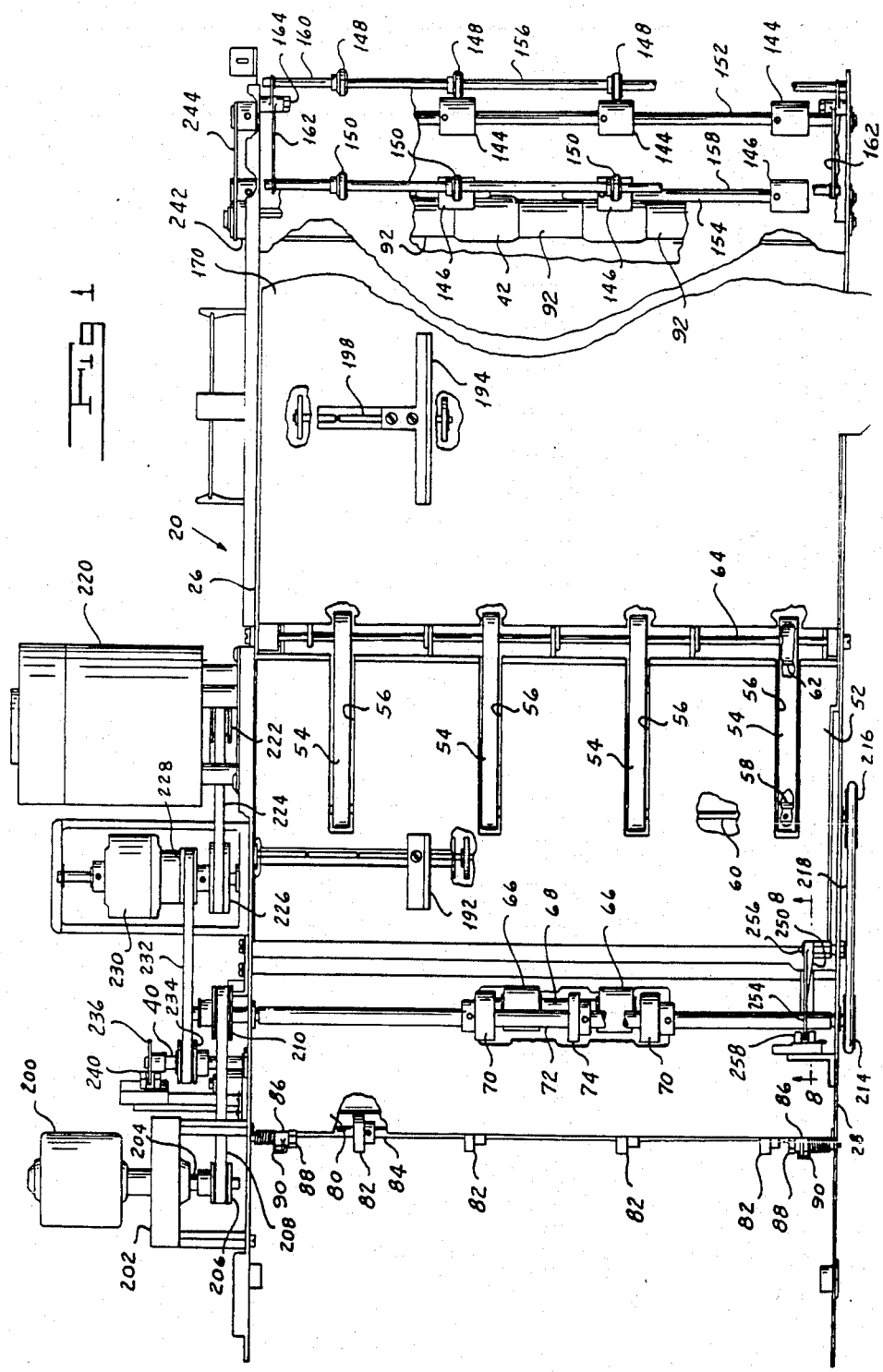

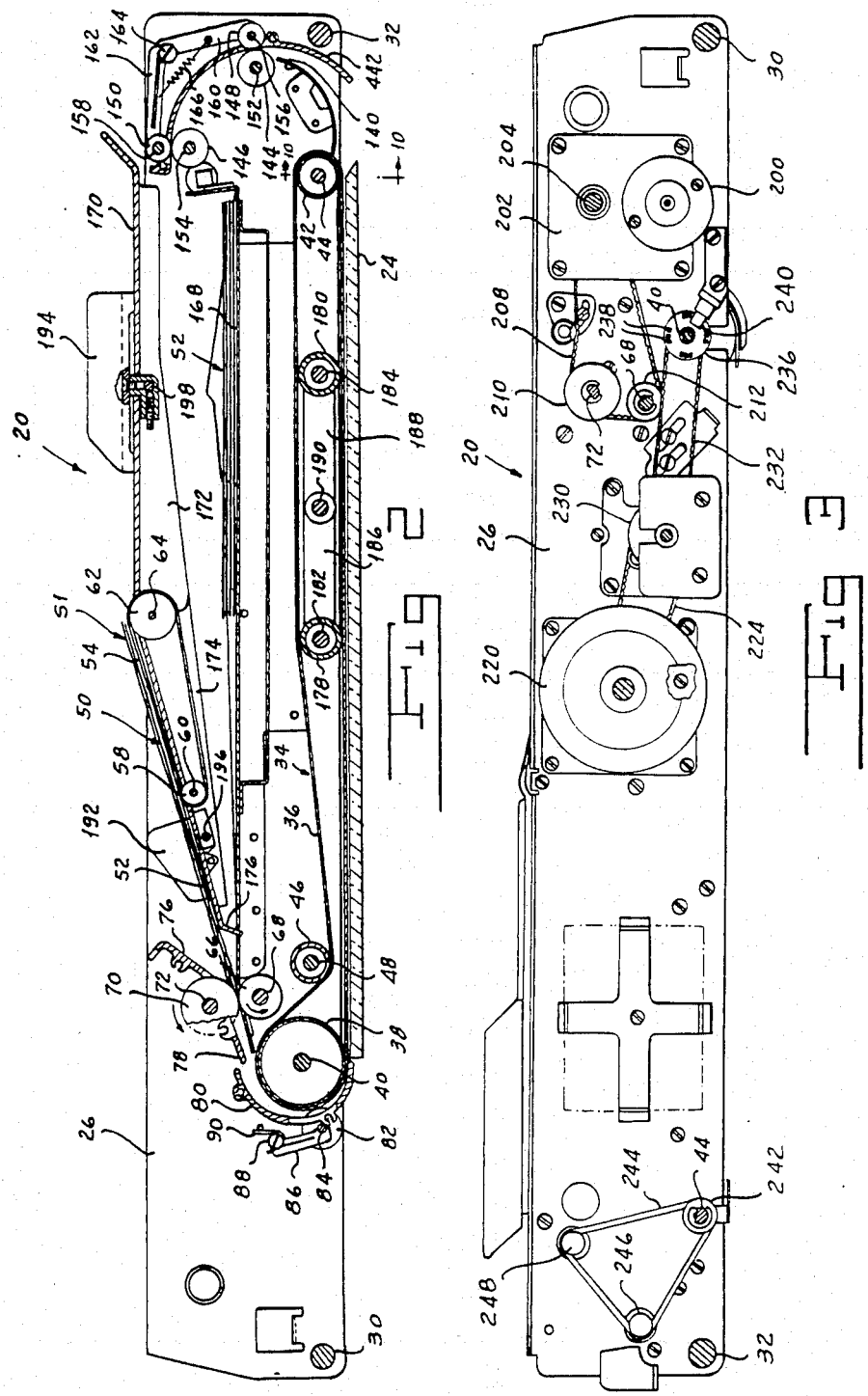

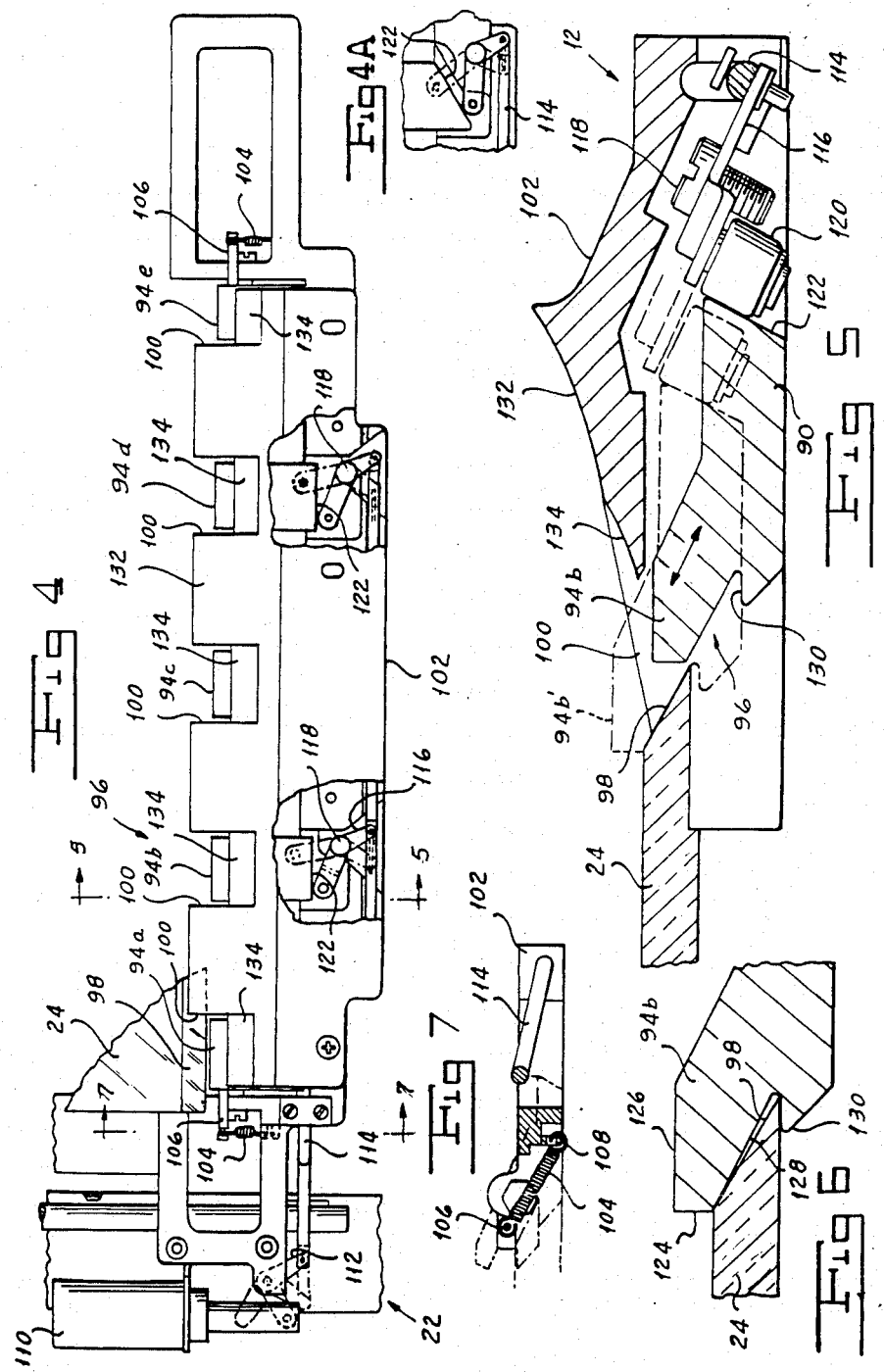

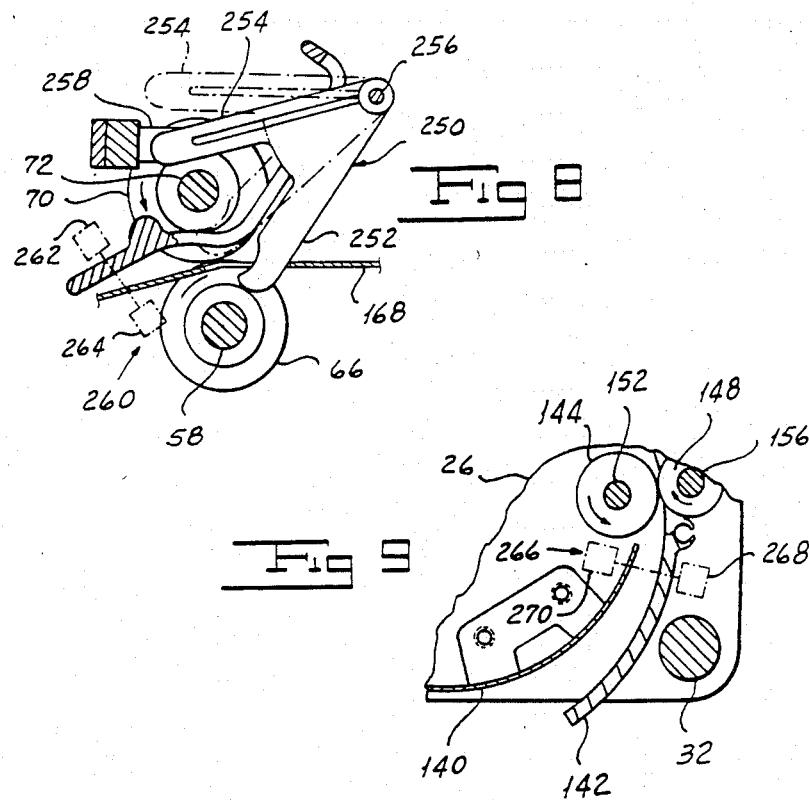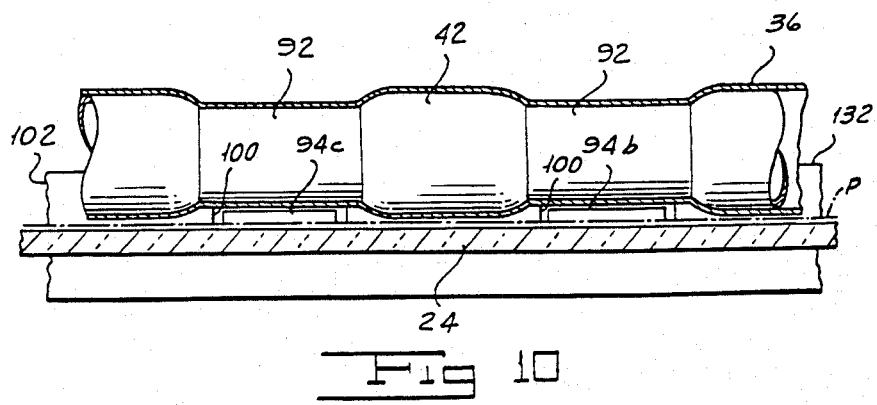

AUTOMATIC DOCUMENT FEEDER AND REGISTRATION SYSTEM THEREFOR

This application is a divisional of application Ser. No. 449,132, filed Dec. 13, 1982, now U.S. Pat. No. 4,621,799.

BACKGROUND OF THE INVENTION

Document feeders which use endless conveyor belts to advance original documents across the exposure platen of an electrophotographic copier are well known in the art. In feeders of the type shown in U.S. Pat. No. 4,023,791 to Hori et al and U.S. Pat. No. 3,844,552 to Bleau et al, a plurality of transversely spaced belts advance the document to a registration edge of the platen where fingers of a controllable registration gate interdigitate with the belts to arrest the document. While the use of spaced belts and an interdigitating registration gate in this manner ensures reliable document registration, the belts also appear along the margins of copies made from smaller-than-normal originals. Document feeders such as that shown in U.S. Pat. No. 3,747,918 to Margulis et al which use a single wide belt provided with spaced longitudinal sheet-engaging ridges share this drawback, owing to the clear line between the ridges and the flat part of the belt. Still other feeders such as disclosed in U.S Pat. No. 4,093,372 to Guenther which use a single flat belt to obviate this problem do so only at the cost of reliable document registration. Since the registration gate cannot interdigitate with the belt, the leading sheet edge will tend to work its way between the feed belt and the registration gate and beyond the registration edge of the platen.

Bleau U.S. Pat. No. 3,910,570 discloses a document feeder in which a plurality of axially spaced pressure rollers interdigitating with the upwardly extending fingers of a retractable exit gate are urged downwardly against the lower run of the feed belt to ensure that the leading edge of the document remains in contact with the exposure platen. May U.S. Pat. No. 4,247,095 discloses a similar arrangement in which, rather than separate axially spaced pressure rollers, a single pressure roller with reduced-diameter portions opposite corresponding raised portions of a registration edge is used to urge the leading edge of the document against the exposure platen. While these arrangements may reduce or eliminate the problem of background clutter referred to above, they also introduce an undesirable amount of complexity into the overall system.

Other problems arise from the use of a registration gate to align documents along the registration edge of a platen. Since the documents are advanced across the exposure platen at fairly rapid speeds, 75 inches per second not being an uncommon figure, their sudden stop at the registration edge requires large decelerative forces that can damage the leading edge of the document being fed. In addition, owing to the high-speed impact of the document against the registration gate, the document tends to rebound from the edge, resulting in misregistration. While these undesirable effects can be reduced somewhat by reducing the document speed, such a reduction in speed also reduces the copy rate obtainable using the document feeder Still other problems associated with automatic document feeders of the prior art relate to the separating of individual sheets from a stack and the advancing of them to the exposure station. Automatic feeders must be able to advance documents through, or to a registered position within, the copier exposure station in an extremely short period of time to maintain a high copy rate, especially if the document must remain stationary in the exposure station for an appreciable portion of the copy cycle while being scanned by a moving-mirror copier optics. One way to increase the effective copy rate, shown in Fackler U.S. Pat. No. 3,556,512, is to move a second document to a ready position, separated from the stack and adjacent the exposure station, while a first document is being scanned. Not only does this reduce the distance that documents to be copied must be transported during the scanning return stroke, but it reduces additional delays due to slippage, since the document to be copied is already in the nip formed by opposing pinch members rather than awaiting separation from a stack by opposing feed and retard members or the like.

Although this disclosed system of feeding a second sheet to a ready, or preregistered, position while a first sheet is being copied permits a higher copy rate, certain problems remain. Since Fackler requires additional feed elements to advance the preregistered document to the exposure station, he introduces a discontinuity of gripping surfaces between the stack and the station. Not only does this obviously increase the complexity of the overall feeder, but it also increases the chances for skewing, slippage or the like.

Caldwell U.S. Pat. No. 4,043,665 discloses a semiautomatic document feeder in which documents inserted manually past a switch sensor are advanced to a preregistration position defined by gates just downstream of a set of registration rollers initially retracted from the platen belt. When a preceding document on the platen has been copied, the registration rollers are moved into engagement with the belt to grip the preregistered sheet, and the registration gates are simultaneously retracted to permit the sheet to be moved onto the platen. While such an arrangement locates preregistered documents in a nip formed by the platen belt itself, it is still a relatively complicated arrangement, owing to the various gates and retractable rollers that must be actuated at the proper time.

Guenther U.S. Pat. No. 4,093,372 discloses a recirculating document feeder in which the bottom sheet of a stack of documents is pre-inserted into the nip formed by a pair of opposing feed rollers which are actuated to advance the sheet to the exposure platen. However, Guenther does not support the stack of documents at a location spaced from the feed rollers, but rather maintains the stack in a shingled (i.e., partially separated, partially overlapping) configuration to avoid the necessity of opposing sheet-feeding and sheet-separating members. Not only is such a configuration easily disturbed, but it imposes an additional limit on the maximum number of sheets that can be contained in the stack while maintaining reliable operation. In addition, since Guenther provides a second, independently driven pair of opposing feed members between the first pair and the exposure platen, he subjects the sheets to a discontinuity in drive force as the sheets enter the second nip.

Suzuki et al U.S. Pat. No. 4,009,957 discloses an electrophotographic copier in which copy sheets are advanced into a preregistration nip formed by stationary, contacting registration rollers so as to buckle the sheet in the nip. The rollers are subsequently driven to feed the preregistered sheets to the transfer station of the copier. Suzuki et al do not disclose such a preregistration arrangement in the context of a document feeder, however, nor do they disclose a system in which sheets are advanced to a preregistration position defined by a roller and a belt.

Hori U.S. Pat. No. 4,231,562 discloses a feeder similar in some respects to that of Caldwell in which sheets are automatically fed from a stack to a preregistration position defined by a gate. The gate is immediately downstream of an initially open nip formed by drive rollers, which are coaxial with a pulley supporting the platen belt, and a set of pressure rollers which are subsequently moved into engagement with the drive rollers to advance the preregistered sheet to the platen. Since, however, documents are not advanced to the drive and pressure rollers while these feed members are in a nip-forming configuration, a feed discontinuity, and thus occasion for sheet damage, is introduced when the nip-forming members are ultimately engaged with each other.

Still another problem associated with document feeders of the prior art involves the detection of the misfeeding of sheets from a stack of documents. It is common in the art, as shown, for example, in Burlew et al U.S. Pat. No. 4,078,087, to test for misfeed by examining a downstream sheet sensor after a predetermined time period has elapsed following the actuation of a sheet-feeding member to advance a sheet from the stack. If the sheet has not reached the sensor within the predetermined time period, a jam is presumed, and a fault declared However, when a stack of documents is first placed in the document tray of the feeder, a substantial period may elapse before the stack has settled into a position assuring adequate contact between the driven feed members and the sheet to be fed. If a time period is selected which is short enough to detect jams before significant damage to documents occurs, that same time period may result in a premature declaration of a fault due to a jam when the document tray is initially loaded.

FIELD OF THE INVENTION

This invention relates to apparatus for feeding documents one by one to an exposure station and, more particularly, to apparatus for feeding documents to the exposure platen of an electrophotographic copier.

DESCRIPTION OF THE PRIOR ART

In addition to the patents described above, the following references are pertinent in varying degrees to the subject matter of this disclosure.

Gardner et al U.S. Pat. No. 3,473,035 discloses a document feeder in which a feed belt having a sheet document electrostatically adhered thereto is slowed a predetermined distance before the leading edge of the sheet reaches an exposure position at which the belt is stopped. However, Gardner et al do not use a gate to stop the sheet at a registration position, and rely instead on the timing of the belt deactuation to stop the sheet at the desired point.

Fackler U.S. Pat. No. 3,556,512 discloses, in addition to the features mentioned above, the use of an encoding wheel coupled to a moving element of the document feeder for controlling the timing of the various steps in the feed cycle. No suggestion is provided, however, as to operating the feed elements at different speeds at various stages of the overall cycle.

SUMMARY OF THE INVENTION

In accordance with one aspect, or feature, of our invention, an apparatus for advancing a sheet to a predetermined registration location on an exposure platen includes a rotary member which supports a flat belt adjacent the registration location to position the belt with a portion thereof adjacent the exposure platen, the adjacent belt portion extending substantially across the width of the exposure platen and being adapted to move the sheet toward the registration location. The rotary member is formed with one or more reentrant portions in axially spaced portions thereof to form corresponding corrugations in the belt, while barrier means are adapted to extend into the belt corrugations to intercept the sheet at the registration location. The belt is driven in such a direction as to move the sheet toward the registration location.

According to another feature of our invention, the sheet is initially fed along the exposure platen at a first speed toward the registration location at which the leading sheet edge is intercepted to arrest the sheet. Prior to the arrival of the sheet at the registration location, and preferably upon the movement of the sheet to within a predetermined distance of the registration location, the sheet feeding is discontinued at the first speed, either by discontinuing the drive entirely or preferably by continuing the drive at a lower speed, to cause the leading sheet edge to be intercepted at the registration point at a speed lower than the first speed. Preferably, the advance of the sheet to within a predetermined distance of the registration location is sensed by counting position pulses generated by an encoding wheel rotating synchronously with the movement of the sheet.

In yet another aspect, our invention contemplates apparatus for feeding documents to an exposure station from a stack in which a pair of opposing feed members having a nip-forming configuration in which they form a sheet-receiving nip are arranged on a path leading to the station at a location spaced from the document stack. Preferably one of the feed members comprises a belt having a portion overlying the exposure platen. Documents are individually advanced from the stack to the opposing feed members while in their nip-forming configuration to inject the documents into the nip, and means are operable only subsequent to the injection of a document into the nip for driving the feed members to advance the document to the exposure station.

In yet another aspect, our invention contemplates apparatus in which means such as cooperating feed and retard members are adapted to be energized to advance a sheet from a stack to a location spaced therefrom and in which means are provided for gripping the sheet at that location to continue to advance the sheet. The first advancing means is deactuated following the arrival of the sheet at the location of the gripping means, but is momentarily reactuated prior to the emergence of the sheet from the first advancing means to ensure separation of the sheet from the remaining sheets in the stack.

According to yet another aspect of our invention, a first time period is initially set within which a sheet fed from the document tray must reach a downstream jam sensor, after which a second time period shorter than the first period is set for the feeding of sheets between the same locations. The first time period is selected to be long enough to allow a stack of originals to become fully engaged with the feed members after initial tray loading, while the second time period is sufficiently short to detect jams in time to prevent appreciable damage after the originals have become fully engaged. Preferably the changeover between the longer and shorter time periods occurs after the feeding of a first sheet from a newly loaded stack of documents, since it is at this point that the requirement of synchronizing with the copier timing imposes an additional constraint on the amount of time allowable. By successively employing two different time periods in this manner to determine the presence of a jam, one is able to detect most jams rapidly enough to prevent damage to documents, while at the same time preventing premature fault detection at the time that the stack is initially loaded.

OBJECTS OF THE INVENTION

One object of our invention is to provide a document feeder for an electrophotographic copier which reliably registers documents at a predetermined position upon the copier exposure platen Another object of our invention is to provide a document feeder for an electrophotographic copier which produces copies with clear backgrounds from smaller-than-normal originals.

Still another object of our invention is to provide a document feeder which does not damage the original documents being handled.

Another object of our invention is to provide a document feeder which minimizes feed time, and thus maximizes the effective copy rate.

Still another object of our invention is to provide a document feeder which ensures reliable feed and minimizes delay occasioned by slippage.

A further object of our invention is to provide a document feeder which minimizes discontinuities occasioned by transitions between different gripping surfaces.

A still further object of our invention is to provide a document feeder which is especially adaptable for use with a copier in which originals must remain stationary during an appreciable portion of the exposure cycle.

Yet another object of our invention is to provide a document feeder which is simple in construction.

Another object of our invention is to provide an original document feeder which detects jams rapidly enough to prevent damage to originals being fed.

Still another object of our invention is to provide an original document feeder which does not declare a fault due to a sheet jam prematurely upon initial loading or improper placement of sheets in the document tray.

Other and further objects will be apparent from the following description.

BRIEF DESCRIPTION OF THE DRAWINGS

In the accompanying drawings to which reference is made in the instant specification and in which like reference characters are used to indicate like parts in the various views:

FIG. 1 is a top plan of our automatic document feeder, with parts broken away.

FIG. 2 is a longitudinal section of the feeder shown in FIG. 1 illustrating the placement of the feeder relative to the exposure platen of the copier with which it is used.

FIG. 3 is a rear elevation of the feeder shown in FIG. 1, with parts broken away and with other parts shown in section.

FIG. 4 is a fragmentary top plan, rotated 90° clockwise from the view of FIG. 1, of the registration gate assembly associated with the feeder shown in FIG. 1.

FIG. 4A is a fragmentary top plan of an alternative form of registration gate to the one shown in FIG. 4.

FIG. 5 is an enlarged section, taken along line 5—5 of FIG. 4, illustrating the positions of the registration gate fingers relative to the exposure platen and copier exit guide in the raised and lowered positions of the gate.

FIG. 6 is a fragmentary section, further enlarged from the view of FIG. 5, showing the relation of the mating surfaces of the registration gate and exposure platen in the raised position of the gate.

FIG. 7 is a fragmentary section, taken along line 7—7 of FIG. 4, illustrating one of the retraction springs and the actuating rod of the registration gate assembly of FIG. 4.

FIG. 8 is a fragmentary section, taken along line 8—8 of FIG. 1, illustrating the tray and entry sensors of the feeder shown in FIG. 1.

FIG. 9 is a fragmentary section illustrating the exit sensor of the feeder shown in FIG. 1.

FIG. 10 is an enlarged fragmentary section, taken along line 10—10 of FIG. 2, illustrating the extension of the gate fingers into the corrugations formed in the platen belt in the raised position of the registration gate.

DESCRIPTION OF THE PREFERRED EMBODIMENT

Figure 11:
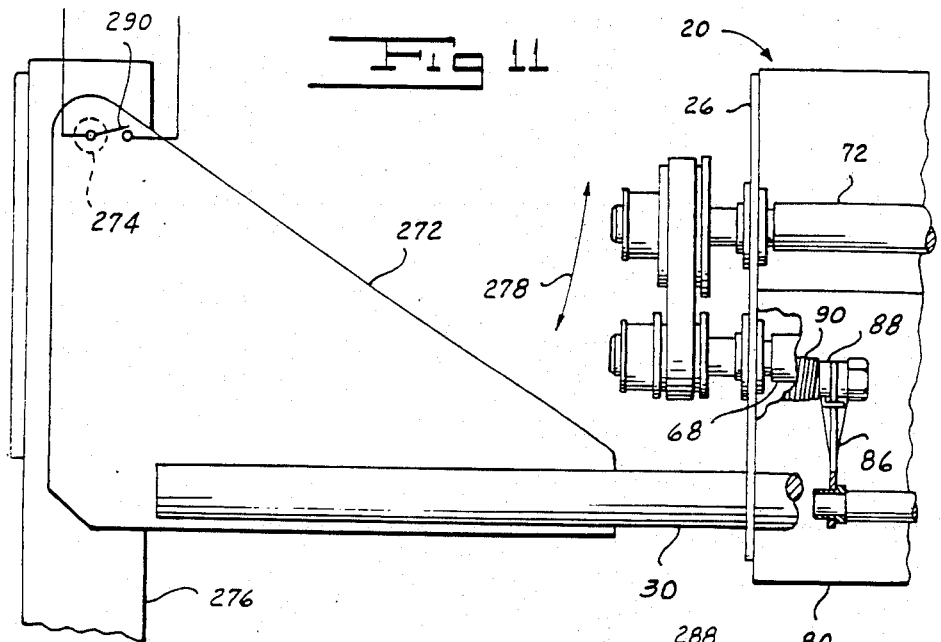
FIG. 11 is a fragmentary left-side elevation of the feeder shown in FIG. 1, with parts broken away and with other parts omitted.

Referring now to the drawings, a document feeder incorporating the present invention, indicated generally by the reference numeral 20, has an operative position shown in FIG. 2 in which it overlies the exposure platen 24 of an electrophotographic copier, shown fragmentarily in FIG. 4 and indicated generally by the reference numeral 22. The feeder 20 includes a pair of transversely spaced rear and front sidewalls 26 and 28. Respective support rods 30 and 32 support the feeder 20 for pivotal upward movement about an axis parallel to the lower edges of sidewall 26, as shown in FIG. 11, to provide access to the platen 24 for copying thick originals such as books.

The lower transport assembly of the feeder 20, indicated generally by the reference numeral 34, includes a unitary conveyor belt 36, preferably formed of the cloth-based synthetic rubber sold by E. I. duPont de Nemours & Co. under the trademark Hypalon, having a highly reflective white outer surface. An intake roller 38 disposed across the left end of the exposure platen 24 as viewed in FIG. 2 and an exit roller 42 disposed across the right end of the exposure platen 24 support the belt 36 in the operative position of the feeder 20 with the lower run of the belt in contact with the upper surface of the platen. Intake roller 38 is supported by a shaft 40 rotatably received by respective sidewalls 26 and 28, while exit roller 42 is supported by a shaft 44 also rotatably received by respective sidewalls 26 and 28. An idler roller 46 rotatably supported on a shaft 48 presses against the upper run of belt 36 between end rollers 38 and 42 to tension the belt.

Belt 36 receives originals to be fed to the exposure platen 24 from an upper transport assembly, indicated generally by the reference numeral 50, in which a stack S1 is carried by a supply tray 52 mounted between sidewalls 26 and 28 above the exposure platen. Tray 52 has an end adjacent the upper portion of roller 38, and is inclined upwardly away from that end to bias documents in the stack S1 toward the upper portion of roller 38. A pair of axially spaced feed rollers 66, supported on a shaft 68 beneath the feed path from the stack S1 to the roller 38, cooperate with end retarding rollers 70 and a low-friction center restricting roller 74, supported by a shaft 72 on the upper side of the same feed path, to ensure the feeding of only a single sheet at a time from the stack S1 to the roller 38. Feed rollers 66 have a relatively high coefficient of friction, while retarding rollers 70 have a coefficient of friction that is lower than that of the feed rollers 66 but higher than that between two contacting sheets of paper. As is more fully described in U.S. Pat. No. 4,231,562 to Hori, restricting roller 74 extends radially into the gap separating the two feed rollers 66 to corrugate the sheet of paper being fed to give it a degree of longitudinal rigidity.

Feed rollers 66 are driven in a counterclockwise direction as viewed in FIG. 2 to advance the lowermost sheet of the stack S1 between rollers 66 and rollers 70 and 74, while rollers 70 and 74 are also driven in a counterclockwise direction to urge any additional sheets that may have passed between the rollers back in the direction of the stack S1. One-way couplings (not separately shown) between feed rollers 66 and their associated support shaft 68 permit freewheeling counterclockwise rotation of rollers 66 relative to shaft 68 to permit their overdrive by the downstream sheet-feeding elements to be described, which are driven at a slightly greater surface velocity. To ensure that sheets in the stack S1 are urged in the direction of rollers 66, 70 and 74, a plurality of conveyor belts 54 are provided at spaced locations across tray 52. Belts 54 are each supported by a first pulley 58 carried by a shaft 60 adjacent rollers 66, 70 and 74 and by a second pulley 62 carried by a shaft 64 remote from rollers 66, 70 and 74. Belts 54 extend upwardly through respective slots 56 formed in tray 52 to contact the lowermost sheet in the stack S1. Pulleys 58 and 62 are driven counterclockwise as viewed in FIG. 2 to urge the lower sheet in the direction of rollers 66, 70 and 74. A guide 76 extending between sidewalls 26 and 28 forms an acute angle with the stack S1 supported by tray 52 to define a throat into which the sheets in stack S1 are urged. Guide 76 is formed with fingers 78 that extend between roller shafts 68 and 72 to define a clearance gap with feed rollers 66 of approximately 3 millimeters.

After a sheet advanced from the bottom of the stack S1 passes between feed rollers 66 and retard rollers 70, a semicircular guide 80 directs the sheet around the periphery of roller 38 into a registration nip formed by belt 36 and resilient registration rollers 82 carried by a shaft 84. Registration roller shaft 84 is in turn received by a pair of pivot arms 86 mounted on pivot screws 88 carried by sidewalls 26 and 28 and biased in the direction of belt 36 by means of torsion springs 90 associated with the respective arms 86. Belt 36 remains unactuated while the sheet approaches the registration nip to allow the leading sheet edge to fully enter the registration nip to ensure effective registration. Feed belts 54 and feed rollers 66 remain actuated for a sufficient time to allow the leading sheet portion to become buckled slightly in the region of the registration nip. After the original emerges from the preregistration nip formed by rollers 82 and belt 36, it is directed further around the intake roller 38 to the imaging platen 24.

As shown in FIG. 10, the roller 42 located at the exit end of the exposure platen 24 is formed with reduced-diameter or re-entrant portions 92 at spaced locations along its length to form corresponding indentations or corrugations in the outer surface of the adjacent portions of belt 36. The corrugations in belt 36 receive respective upwardly projecting integrally formed gate portions, or fingers, 94a to 94e of a registration gate indicated generally by the reference numeral 96, extending across the exit end of the exposure platen 24.

Referring now particularly to FIGS. 4 to 7, the exposure platen 24 is formed at its right end as viewed in FIGS. 2 and 5 with an oblique, upwardly facing registration edge 98 to ensure evenness of exposure of the adjacent portion of the document presented to the platen. Fingers 94a to 94e, which are mounted for movement as a unit in a direction parallel to the surface of registration edge 98 (FIG. 5), extend upwardly out of slots 100 formed in a lower exit guide 102 carried by the frame of the copier 22. Tension springs 104 extending between lugs 108 carried by the exit guide 102 and lugs 106 carried at opposite ends of the registration gate 96 normally bias the fingers 94a to 94e to a retracted position shown in solid lines in FIGS. 4 and 5 with the fingers fully inside the slots 100. Actuation of a solenoid 110 carried by the copier 22 in front of platen 24, as shown in FIG. 4, causes a bell crank 112 to rotate clockwise about its pivot axis, drawing in turn an actuator rod 114 extending along registration edge 98 to the left as viewed in FIG. 4. This movement of actuator rod 114 in turn causes clockwise rotation of individual bell cranks 116 associated with respective fingers 94a to 94e about their pivots 118. Upon this movement of bell cranks 116, cams 120 carried by bell cranks 116 bear against camming surfaces 122 of the fingers 94a to 94e to urge the fingers upwardly, in the direction shown in FIG. 5, to a blocking position indicated by the dot-dash position 94b' of finger 94b shown in FIG. 5.

Camming surfaces 122 may extend either along a line parallel to the registration edge 98, as shown in FIG. 4, or obliquely thereto as in the alternative construction shown in FIG. 4A.

As shown in FIG. 6, each of fingers 94a to 94b is formed with a vertical registration surface 124, the lower edge of which is flush with the upper surface of exposure platen 24 in the blocking position of the fingers 94a to 94e. Each of fingers 94a to 94e is also formed with a horizontal upper surface 126; the height of which above the upper surface of exposure platen 24 in the upper position of the gate 96 is such as to permit the fingers 94a to 94e to interdigitate with the corrugated, or re-entrant, belt portions shown in FIG. 10. Preferably, surface 128 of fingers 94a to 94e adjacent to the oblique registration edge 98 forms a slight angle with that registration edge, as shown in FIG. 6. Also, fingers 94a to 94e are preferably formed with a projection or catch 130 below mating surface portion 128 to define the upper, blocking position of the gate fingers.

Referring now to FIG. 5, lower exit guide 102 is formed with a guide surface 132 extending upwardly away from the oblique registration edge 98 of the exposure platen 24 to guide sheets from the platen toward the exit rollers of the feeder 20, to be described. Preferably, the guide surface 132 includes recessed portions 134 in the regions of the slots 100, as shown in FIGS. 4 and 5, to prevent the leading edges of the guide surface 132 from interfering with the delivery of a sheet.

After exposure, solenoid 110 is deactuated to return the registration gate 96 to a retracted position to allow belt 36 to deliver the sheet to an output tray 168 disposed above the upper run of belt 36 between sidewalls 26 and 28. Respective inner and outer exit guides 140 and 142 guide the sheet along a semicircular upward path between the exposure platen 24 and the output tray 168. To ensure the complete emergence of the sheet at the upper end of the exit path, a first plurality of opposing inner and outer exit rollers 144 and 148 are provided at one location along the exit path, and a second plurality of opposing inner and outer exit rollers 146 and 150 are provided at a second location along the exit path spaced downstream from the first location. Respective shafts 152 and 154 rotatably received by sidewalls 26 and 28 support inner exit rollers 144 and 146, while shafts 156 and 158, rotatably received by respective pairs of pivot arms 160 and 162 carried by spaced pivots 164 support rollers 48 and 150. Respective tension springs 166 coupling respective adjacent pairs of pivot arms 160 and 162 bias outer exit rollers 148 and 150 against the corresponding inner exit rollers 144 and 146. Referring to FIG. 3, exit roller shafts 152 and 154 extend past sidewall 26 to receive respective pulleys 246 and 248, coupled by means of an 0-ring belt 244 to a pulley 242 carried by exit roller shaft 44.

Tray 168 includes a top cover 170, preferably comprising a translucent plastic, supported by shaft 64 for upward swinging movement to retrieve originals stacked in the tray. Preferably tray cover 170 is formed with spaced longitudinal ribs 172 along its underside which guide the originals from exit rollers 146 and 150 onto the stack in the lower tray 168 while minimizing electrostatic interaction between the sheets and the tray cover. If desired, the upper tray 52 may have similar ribs 174 along its underside, as shown in FIG. 2, to extend the effective guide surface formed by ribs 172. Preferably tray cover 52 is formed with a downwardly extending edge portion 176 to prevent documents delivered to the tray 168 from being re-fed to the platen by feed rollers 66.

To ensure the frictional engagement of a sheet of paper by the belt 36 to move the sheet to the right across the exposure platen 24, as viewed in FIG. 2, we provide a pair of longitudinally spaced pressure rollers 178 and 180 supported by respective shafts 182 and 184. A first pair of transversely spaced pivot arms 186 carried by a shaft 190 extending transversely between feeder sidewalls 26 and 28 support roller shaft 182, while a second pair of transversely spaced pivot arms 188 also carried by pivot shaft 190 support roller shaft 184. Pressure rollers 178 and 180 are biased by their own weight and that of their associated support assemblies to urge the adjacent portion of belt 36 against the platen 24 and hence against any sheet that has been moved into exposure position.

Sheets placed on the upper tray 52 are guided along one edge by sidewall 28 of the feeder 20 and along the opposite edge by edge guides 192 and 194 mounted on the upper tray 52 and lower tray cover 170, respectively. In the system contemplated, letter-size ($8\frac{1}{2} \times 11$ inch) sheets are fed widthwise, while legal-size ($8\frac{1}{2} \times 14$ inch) sheets are fed lengthwise both in the feeder 20 and the copier 22. To accommodate the various sheet orientations, as well as to allow for different sheet widths, edge guides 192 and 194 are transversely adjustable with reference to the direction of sheet feed along rods 196 and 198, which are carried beneath upper tray 52 and lower tray cover 170, respectively, and are provided at several points along their lengths with detents corresponding to various standard sheet sizes. It will be apparent from the foregoing description that lower tray cover 170 effectively serves as an extension of the upper sheet tray 52, owing to the flexibility of the sheets forming the stack. At the same time, however, tray cover 170 does not increase the vertical profile of the feeder 20, since it extends purely horizontally in its lowered position.

Referring now particularly to FIGS. 1 and 3, feed rollers 66 and belts 54 receive their drive power from a prefeed motor 200 mounted outboard of feeder sidewall 26. Motor 200 drives a gear box 202 having an output shaft 204 carrying a pulley 206. A timing belt 208 couples motor pulley 206 to a pulley 210 carried by retarding roller shaft 72 as well as to a pulley 212 carried by feed roller shaft 68. Referring now particularly to FIG. 1, retarding roller shaft 72 also carries a pulley 214 outboard of feeder sidewall 28. An O-ring belt 218 couples pulley 214 to a pulley 216 carried by the shaft 60 supporting tray belt pulleys 58.

The lower belt 36 overlying the exposure platen 24 receives its driving power from a separate belt motor 220. Belt motor 220, which is disposed outboard of feeder sidewall 26, carries a pulley 222 coupled by a timing belt 224 to the input pulley 226 of an electrically controlled clutch 230. A timing belt 232 couples the output pulley 228 of clutch 230 to a pulley 234 carried by intake roller shaft 40. An encoder disk 236 also carried by intake roller shaft 40 contains a plurality of equally spaced apertures 238 about the peripheral portion thereof, which apertures are swept between the light source and photodetector portions of an optical sensor 240. Optical sensor 240 is thus exposed to a beam of light each time the shaft 40 rotates through a predetermined angular displacement. Since the angular rotation of shaft 40 determines the linear displacement of the belt 36 and commonly driven feed elements, optical sensor 240 produces pulses synchronous with the movement of each of these feed elements through a predetermined incremental distance. By virtue of this arrangement, the position of the leading edge of the sheet being fed may be determined regardless of fluctuations in the instantaneous speed of the belt 36. In the description that follows, it is assumed that the normal belt velocity is 75 inches (1.90 meters) per second and that the encoder pulse interval at this belt velocity is 2.5 milliseconds An encoder pulse thus represents 4.76 millimeters of sheet travel.

Rather than employing separate motors 200 and 220 to drive feed rollers 66 and platen belt 36, it is of course possible to use a single motor in conjunction with suitably actuated clutches to energize the various feed elements at the proper time. We have found, however, that if the feed rollers 66 are deactuated simply by disengaging a clutch coupling them to a motor, there is a tendency for additional sheets to be driven out from the stack following the emergence of the trailing edge of the first sheet, owing to the rotational inertia of the feed elements. However, if the feed rollers 66 are directly driven from the prefeed motor 200, the damping effect of the motor 200 when deactuated is sufficient to minimize or eliminate this tendency.

Referring now particularly to FIGS. 1 and 8, the sheets on the upper tray 52 are sensed by means of a pivoting bell crank 250 carried by a pivot 256 mounted inboard of feeder sidewall 28. Whenever the tray 52 is empty, the bell crank 250 drops to the position shown in solid lines in FIG. 8, in which the lower arm 252 of the bell crank extends through a slot formed in the lower tray 168 and the upper arm 254 blocks the light path of an optical sensor 258 also mounted inboard of feeder sidewall 28. When, however, the leading edge of a stack of sheets resting on the upper tray 52 protrudes into the nip formed by rollers 66 and 70, the sheets push the bell crank 250 upwardly to move the upper arm 254 to the position 254' shown in dot-dash lines in FIG. 8 out of the light path of optical sensor 258.

An entry sensor 260 comprising a light source 262 and a photodetector 264, preferably disposed adjacent the feeder sidewall 28, senses sheets approaching the preregistration nip formed by preregistration rollers 82 and belt 36 to intercept the light path between the light source and the photodetector. In a similar manner, referring now to FIG. 9, an exit sensor 266 comprising a light source 268 and a photodetector 270 disposed on opposite sides of the exit path from platen 24 senses the presence of documents in the exit path leading from the platen 24. Tray sensor 258, entry sensor 260 and exit sensor 266 are used in a manner to be described to control the timing of the feeder drive elements as well as to sense the presence of a jam.

Referring now to FIG. 11, feeder 20 is mounted for pivotal movement relative to the exposure platen 24, along a line of swinging movement indicated by the arrow 278, to permit the copying of thick originals placed manually on the platen 24, as well as to extricate any documents that may have become jammed as they are moved along the platen by the feeder 20. More particularly, spaced pillars 276, one of which is shown in FIG. 11, receive respective brackets 272 for rotation about a pivot 274. Brackets 272 in turn carry respective support rods 30 and 32 which are received by the feeder sidewalls 26 and 28. Raising the feeder 20 a predetermined distance from the platen 24 closes a normally open switch 290 having a fixed contact carried by one of the pillars 276 and a movable contact carried by a bracket 272. Switch 290 provides a signal to the control system to be described indicating the position of the feeder 20 relative to the platen and, in particular, is used to generate a reset signal following the clearance of a jam.

Figure 12:
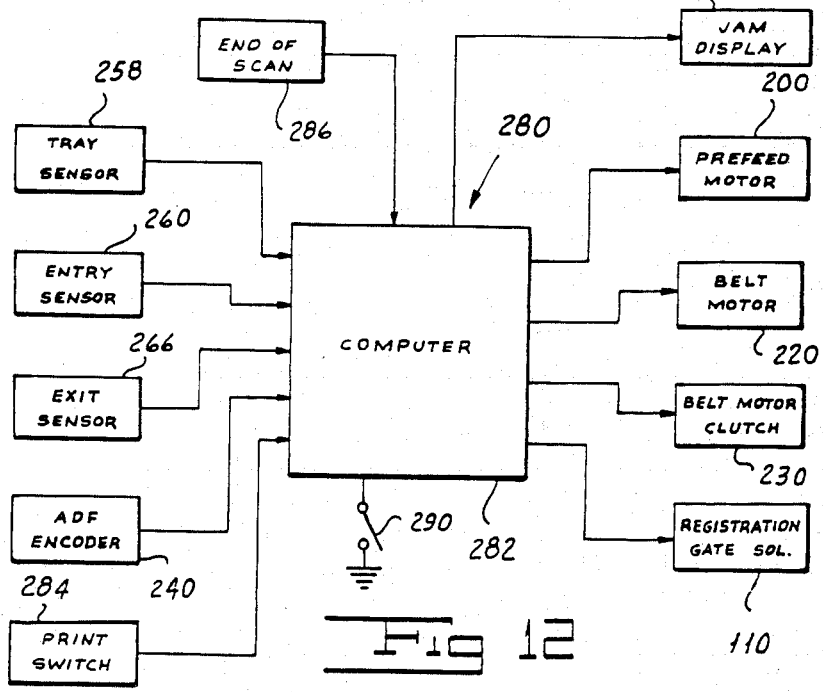
FIG. 12 is a schematic block diagram of a control circuit for the feeder shown in FIG. 1.

Referring now to FIG. 12, the control circuit for the automatic document feeder 20, indicated generally by the reference numeral 280, includes a programmed digital computer 282 of any suitable type known to the art. Computer 282 may comprise either a microcomputer, such as an Intel 8048, having internal data and program memories (not separately shown) or a microprocessor, together with separate program and data memories Preferably, if copier 22 is also to be computer-controlled, the same computer, whether a microcomputer or a microprocessor with external memories, is used to control both the feeder and the copier. It should be emphasized, however, that the logic control units for the copier 22 and feeder 20 may be entirely separate if desired and that the internal structure of the copier logic as such forms no part of the present invention.

Computer 280 provides control signals to the electromechanical devices of the feeder 20, including the prefeed motor 200, the belt motor 220, the belt motor clutch 230, the registration gate solenoid 110, and a "jam" display 288 of any suitable type known to the art. In the case of belt motor 220, computer 282 supplies suitable control signals to energize the motor 220 at either a high speed or a low speed, or to de-energize the motor 220 entirely. Computer 282 also receives input lines from the various sensors of the feeder 20, including the upper tray sensor 258, the entry path sensor 260, the exit sensor 266 and the optical sensor 240 adjacent the feeder encoder disk 236 Preferably, sensor 240 is coupled to an internal counter (not separately shown) of the computer 282 through an interrupt input to allow the counter to be indexed by the encoder pulses in the course of the execution of the main control routine.

In addition to these inputs from the various sensors of the feeder 20, computer 282 receives an input from a print switch 284 which is actuated by the operator to initiate the automatic feeding operation Computer 282 also responds to an end-of-scan signal provided by a suitable device 286 of the copier 22 indicating the completion of exposure of a document placed on the platen 24. The end-of-scan signal may be derived in any manner known to the art. Thus, if the apparatus shown in Suzuki et al U.S. Pat. No. 4,009,957 is used for the copier 22, the end-of-scan signal may be derived from the scan return switch Sw5 or Sw6, depending on the length of the scanning stroke. Alternatively, if the copier 22 itself is computer controlled, the end-of-scan signal may be derived by using an encoder disk similar to disk 236 in the copier drive and counting a fixed number of pulses following a predetermined cycle event, such as the return of the optical scanner to its home position.

Figure 13:
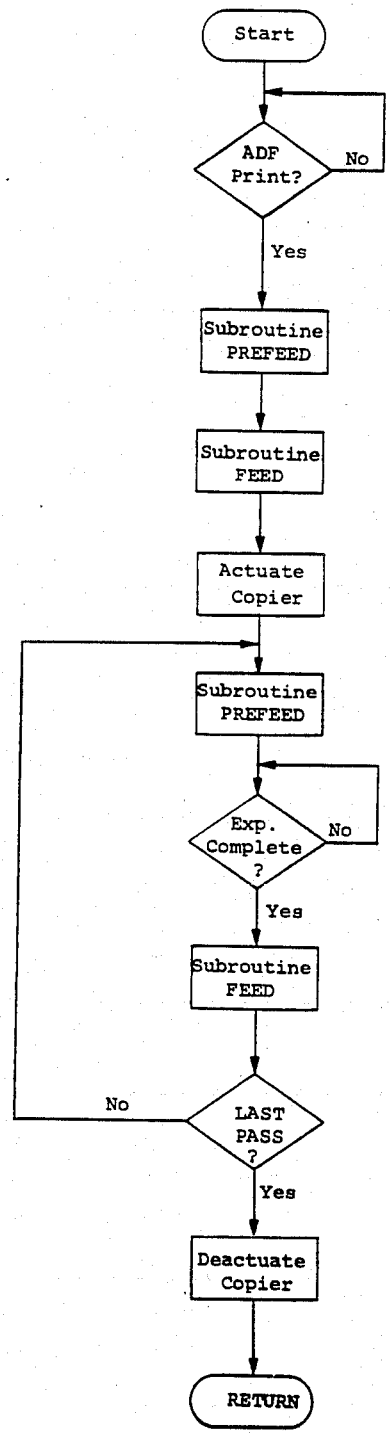
FIG. 13 is a flowchart illustrating the overall sequence of operation of the feeder shown in FIG. 1.

Referring now to FIG. 13, the main routine followed by computer 282 for controlling the operation of the automatic document feeder 20 initially waits until the operator presses the feeder print switch 284. When this occurs, the routine calls the PREFEED subroutine shown in FIG. 14, which advances a sheet from the bottom of the stack on tray 52 to the preregistration nip formed by rollers 82 and belt 36. Upon return from this subroutine, the routine next enters a FEED subroutine, shown in FIGS. 15a and 15b, in which the belt 36 is actuated to advance the first sheet to a position on the exposure platen 24 defined by registration gate 96. Thereafter, the copier 22 is actuated to initiate scanning of the original placed on the platen 24. Such actuation of the copier may be performed by any suitable means, such as by closing the print switch SW1 of the copier shown in the Suzuki et al patent identified above.

Figure 14:
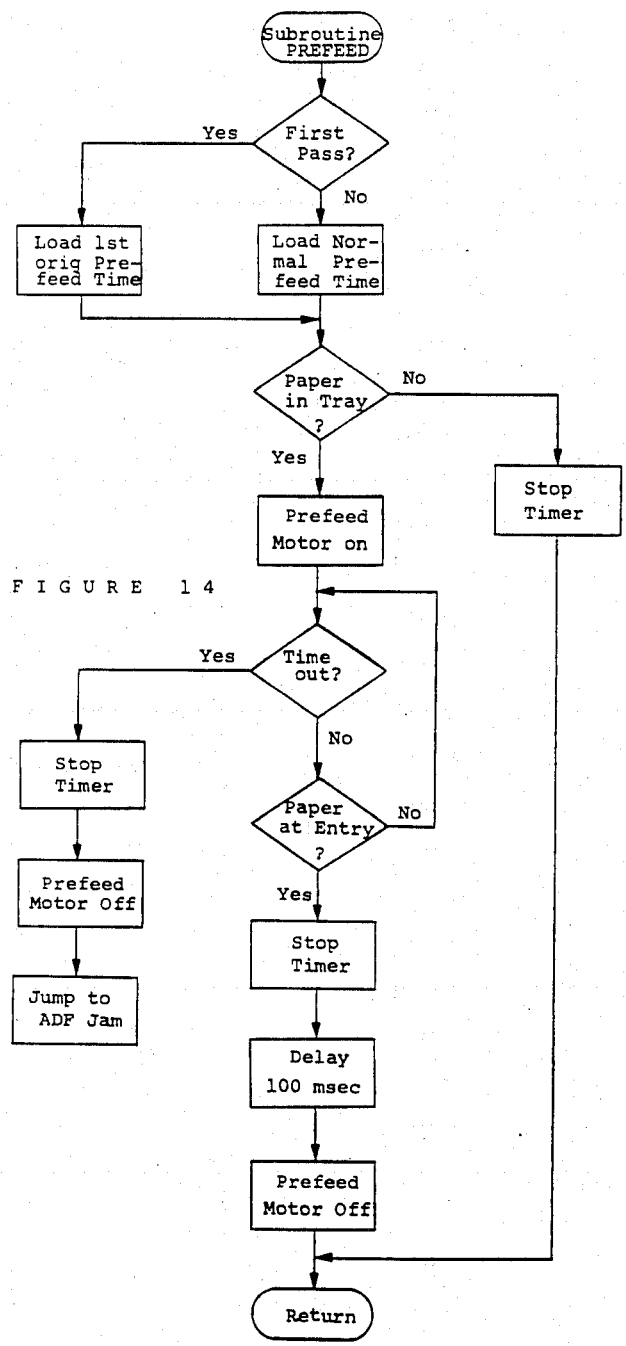
FIG. 14 is a flowchart illustrating the sequence of operation of the prefeed subroutine of the feeder shown in FIG. 1.

While the copier 22 is scanning the first original placed upon the exposure platen 24, the feeder control routine immediately re-enters the PREFEED subroutine shown in FIG. 14 to prefeed a second original to the preregistration nip formed by preregistration rollers 82 and belt 36. By re-entering the prefeed subroutine immediately in this manner, rather than waiting for the completion of the exposure step, one maximizes the effective copy rate obtainable, since otherwise both the prefeed and feed subroutines would have to be completed between successive exposures for each document presented to the platen.

After the completion of exposure of the document on the platen 24, as indicated by the end-of-scan signal from source 286, the feed subroutine is re-entered to advance the second preregistered document to the exposure platen 24 while at the same time delivering the first document from the platen to the receiving tray 168. The routine then successively re-enters the prefeed and feed subroutines to advance succeeding documents to the exposure platen, in each case waiting for completion of exposure before entering the feed subroutine. When, as indicated by the tray sensor 258 in a manner to be described, there are no more sheets remaining to be fed either from the upper tray 52 or the platen 24, the routine deactuates the copier 22 and returns to the start to await the subsequent actuation of the feeder print switch 284. Deactuation of the copier 22 may be performed by any suitable means, such as by reopening the print switch SW1 of the copier shown in Suzuki et al U.S. Pat. No. 4,009,957.

Referring now to FIG. 14, in the prefeed subroutine, which is successively entered to advance documents to the preregistration nip formed by registration rollers 82 and platen belt 36, an internal timer (not shown) of the computer 282 is first set to define a maximum time interval within which the leading edge of a document advanced from the tray 52 should reach the entry path sensor 260. As already mentioned, a "first original" prefeed time, preferably about 2.3 seconds, is used on the first pass, while a shorter prefeed time, preferably about 480 milliseconds, is used on succeeding passes. The subroutine then checks the tray sensor 258 to determine whether any sheets remain in the upper tray 52. If there are no more sheets remaining in the tray 52, this indicates that all of the sheets have been fed from the upper tray, and the subroutine sets a "last pass" flag (not shown) internal to the computer 282 to record this fact. The subroutine then stops the timer that was previously set and returns to the main routine shown in FIG. 13.

If, on the other hand, the tray 52 still contains sheets, the subroutine energizes the prefeed motor 200 to cause feed rollers 66 to advance the lowermost document to the preregistration nip. If the timer that was previously set counts down to zero before the leading sheet edge passes entry sensor 260, the subroutine stops the timer, deactuates the prefeed motor 200 and jumps to the jam routine shown in FIG. 16, in which display 288 is energized to advise the machine operator of the existence of a jam in the feeder 20.

If entry sensor 260 does sense the leading edge of the document before the lapse of 2.3 seconds or 480 milliseconds as the case may be, the subroutine stops the timer and delays a further 100 milliseconds to allow the leading sheet edge to enter the preregistration nip and buckle slightly to ensure reliable preregistration. Thereafter, the subroutine deactuates the prefeed motor 200 and returns to the main routine shown in FIG. 13.

Figure 15A:
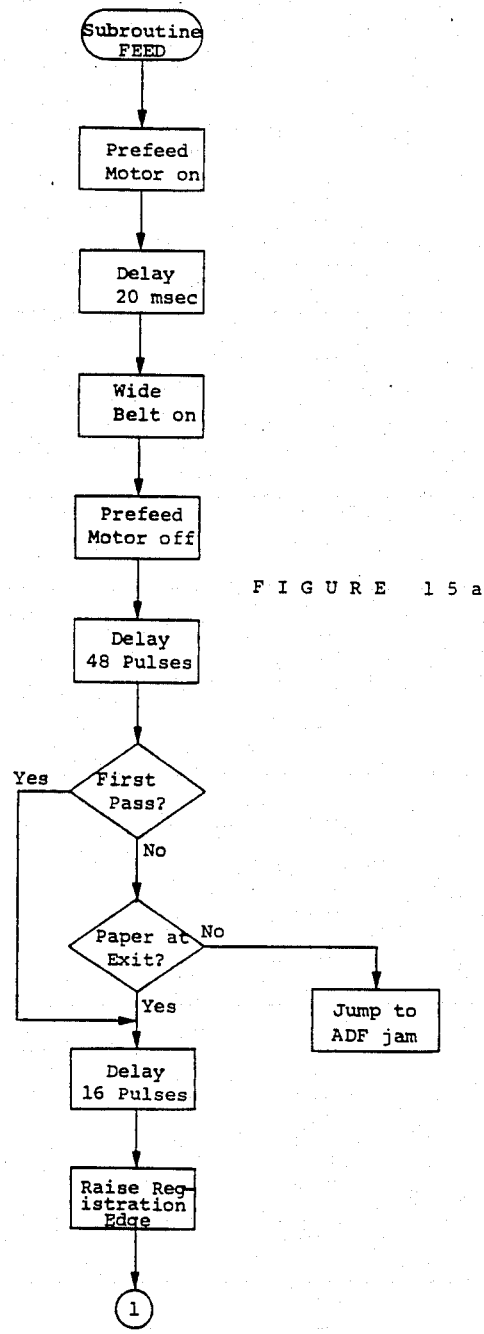
FIGS. 15a and 15b constitute a flowchart illustrating the sequence of operation of the feed subroutine of the feeder shown in FIG. 1.
Figure 15B:
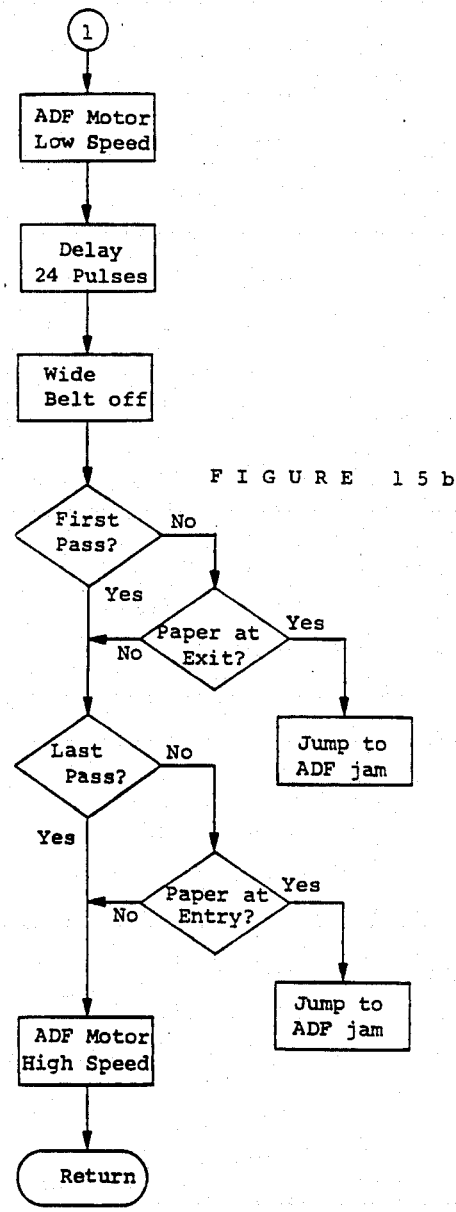

Referring now to FIGS. 15a and 15b, in the FEED subroutine for controlling the drive of the platen belt 36, the prefeed motor 200, which was previously deactuated in the prefeed subroutine, is reactuated for 20 milliseconds to supply a torque pulse to the feed rollers 66. This pulse, as described above, energizes the feed rollers 66 with their full start-up torque to ensure separation of the bottom sheet from any additional sheet which may have passed through the , nip formed by rollers 66 and 70. Next, the platen belt 36 is energized by actuating the belt motor 220 and clutch 230, while the prefeed motor 200 is deactuated immediately thereafter. Actuation of belt motor 220 substantially concurrently with the momentary reactuation of feed rollers 66 ensures that belt 36 will begin to draw the sheet through the preregistration nip before the leading sheet edge has a chance to "spring back" from the nip following its forced injection. Upon energization, belt 36 advances the sheet that has been pre-fed to the nip formed with preregistration rollers 82 to a registered position upon the exposure platen 24.

After a delay of 48 pulses from encoder 240, belt 36 should have advanced any document that was previously on the platen 24 to a position at which it intercepts the light beam of the exit sensor 266. If the current pass is any pass other than the first, the subroutine interrogates the exit sensor 266 at this time to determine whether it has been actuated. If it has not been actuated, this indicates a misfeed of the document previously upon the platen 24, and the subroutine jumps to the ADF jam routine referred to above, shown in FIG. 16. If the exit sensor 266 does sense the exiting sheet, the subroutine delays a further 16 pulses from encoder 240 and then actuates registration gate solenoid 110 to raise the registration gate 96. Immediately thereafter, the subroutine supplies a suitable signal to the belt motor 220 to reduce its speed to 1/5 of its normal speed of 75 inches per second, so that the sheet currently being advanced along the platen 24 to the registration gate 96 strikes the gate at a relatively low speed.

Although it is preferable, from the standpoint of precision of control, to drive the belt at a low speed following the discontinuance of high-speed drive, it is also possible to deactuate the motor 220 entirely, so that the belt 36 continues to move because of its own inertia, and that of its drive elements, and coasts to a stop shortly after the registration gate 96 arrests the sheet on the platen 24. In such a mode of operation, the deactuation of belt motor 220 would be so timed that the belt 36 is still moving at the time of sheet interception by registration gate 96, but at a speed substantially reduced from that immediately preceding motor deactuation.

After a further delay of 24 pulses from encoder 240 to ensure that the document has reached its registration position and that any initial skew has been eliminated, the routine disengages the clutch 230 to disable the belt 36. Belt motor 220 may be either likewise deactuated at this time or, if desired, left running to reduce start-up time on succeeding passes. At this point in the feed subroutine, the exit path should be clear in the area of the exit sensor 266 while the entry path should be likewise clear in the region of the entry sensor 260. Accordingly, on any pass except the first pass, the subroutine interrogates the exit sensor 266 at this time and jumps to the previously identified jam routine if the sensor detects a sheet. Thereafter, on any pass except the last pass, the subroutine interrogates the entry sensor 260 and jumps to the jam routine if that sensor detects a sheet at this time. If neither of the sensors 260 and 266 is actuated, the subroutine then supplies belt motor 220 with a suitable signal switching it to its high-speed mode of operation, following which the subroutine returns to the main program.

Figure 16:
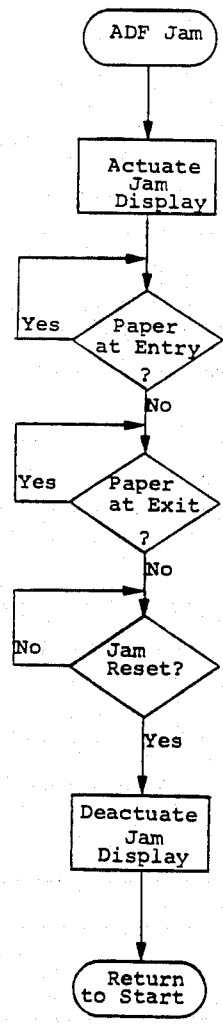
FIG. 16 is a flowchart illustrating the sequence of operation of the jam routine of the feeder shown in FIG. 1.

Referring now to FIG. 16, the jam routine is entered in response to the detection of a jam in the course of the prefeed and feed subroutines in the manner described above. Upon entering the jam routine, the computer 282 actuates the jam display 288 to apprise the operator of the existence of a sheet jam. In a manner known in the art, the jam display 288 may simply comprise an indicator light or if desired may also comprise a coded digital display indicating the particular nature or location of the jam. After actuating the jam display 288, the routine checks the entry and exit sensors 260 and 266 to determine whether the operator has extricated any jammed originals from these locations. When these sensors are clear, and when the operator has actuated the jam reset switch 290 by raising the feeder 20 a predetermined distance from the exposure platen 24, the jam routine deactuates the jam display 288 and returns to the start of the main program shown in FIG. 13.

It will be seen that we have accomplished the objects of our invention. We have provided a document feeder for an electrophotographic copier which reliably registers documents at a predetermined position upon the copier exposure platen. Our feeder produces copies with clear backgrounds from smaller-than-normal originals and does not damage original documents being handled. Further, our feeder has the sheet awaiting copying in a ready position in a feed nip adjacent to the exposure platen to minimize feed time, thereby to maximize the overall copy rate, as well as to ensure reliable feed and minimize delay occasioned by slippage. Our feeder minimizes discontinuities occasioned by changeovers of gripping surfaces, and is especially compatible with a feed belt which must remain stationary during exposure. Our feeder detects jams rapidly enough to prevent damage to originals being fed. At the same time, however, it does not declare a sheet jam prematurely upon initial loading or improper placement of sheets in the document tray.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention what we claim is:

1. In a sheet feeder having means for supporting a stack of sheets to be fed, means adapted to be actuated to advance a sheet from said stack to a location spaced therefrom, and means responsive to the absence of said sheet at said location after a preset time period following the actuation of said advancing means for providing an indication of abnormal operation, the improvement comprising means for initially setting said preset time period as a first time period for the feeding of said sheets to said location and means for automatically and subsequently setting said preset time period as a second time period for said feeding of said sheets which is shorter than said first time period.

2. A sheet feeder according to claim 1 wherein said second time period is set after the feeding of a first sheet from a newly loaded stack of sheets.

3. A sheet feeder according to claim 2 wherein said second time period is set before the feeding of a second sheet from a newly loaded stack of sheets.

4. A sheet feeder according to claim 1 wherein said first time period is greater than about 2 seconds.

5. A sheet feeder according to claim 1 wherein said second time period is about 0.5 seconds.

* * * * *